United States Patent
Keil et al.

(10) Patent No.: US 10,292,129 B2
(45) Date of Patent: May 14, 2019

(54) AUTOMATIC LOCATION-BASED NOTIFICATIONS FOR A GROUP OF USERS

(71) Applicant: Life360, Inc., San Francisco, CA (US)

(72) Inventors: Dylan Keil, Menlo Park, CA (US); Alexander Haro, Las Vegas, NV (US)

(73) Assignee: Life360, Inc., San Francisco, CA (US)

( * ) Notice: Subject to any disclaimer, the term of this patent is extended or adjusted under 35 U.S.C. 154(b) by 0 days.

(21) Appl. No.: 15/484,839

(22) Filed: Apr. 11, 2017

(65) Prior Publication Data

US 2018/0295602 A1    Oct. 11, 2018

(51) Int. Cl.
| | |
|---|---|
| *H04M 3/38* | (2006.01) |
| *H04M 3/533* | (2006.01) |
| *H04W 4/02* | (2018.01) |
| *H04W 68/00* | (2009.01) |
| *H04W 72/12* | (2009.01) |
| *H04W 4/021* | (2018.01) |

(52) U.S. Cl.
CPC ......... *H04W 68/005* (2013.01); *H04M 3/382* (2013.01); *H04M 3/53341* (2013.01); *H04W 4/022* (2013.01); *H04W 4/023* (2013.01); *H04W 72/121* (2013.01); *H04M 2250/10* (2013.01)

(58) Field of Classification Search
CPC ... H04W 68/005; H04W 4/022; H04W 4/023; H04W 72/121; H04M 3/382; H04M 3/53341
See application file for complete search history.

(56) References Cited

U.S. PATENT DOCUMENTS

| | | | |
|---|---|---|---|
| 9,445,230 B1 | 9/2016 | Sipher et al. | |
| 9,503,844 B1* | 11/2016 | Sprague | H04W 4/02 |
| 9,503,851 B2 | 11/2016 | Ben-Dayan et al. | |
| 9,519,903 B2 | 12/2016 | Kannan et al. | |
| 9,549,286 B2 | 1/2017 | Birch et al. | |
| 9,549,305 B2 | 1/2017 | Grube et al. | |
| 9,924,315 B1* | 3/2018 | Cornwall | H04W 4/022 |
| 2012/0161971 A1* | 6/2012 | Nasir | G07C 1/10 340/573.4 |
| 2013/0347054 A1* | 12/2013 | Motoyama | G06F 21/6218 726/1 |
| 2014/0135036 A1* | 5/2014 | Bonanni | H04W 4/023 455/456.3 |
| 2014/0274157 A1* | 9/2014 | Frank | H04L 63/0407 455/456.3 |
| 2015/0163945 A1* | 6/2015 | Barton | G05B 15/02 361/809 |

(Continued)

*Primary Examiner* — Qun Shen
(74) *Attorney, Agent, or Firm* — Womble Bond Dickinson (US) LLP (57) ABSTRACT

Notifications for a group of portable communication device users are provided based on a meeting of two or more users. A current location of each member is obtained and it is determined whether two or more of the members are in a similar location by comparing the current locations. The notification is automatically generated, the notifications including information regarding the context of the meeting and one or more of the location of the meeting, the identities of the users at the meeting, a time of the meeting, and a status of the meeting. The notification is transmitted to other users in the group, the other users being users in the group that are not at the meeting location. An automatic response may be performed based on the context of the meeting.

18 Claims, 4 Drawing Sheets

(56) References Cited

U.S. PATENT DOCUMENTS

2016/0088546 A1* 3/2016 Birch .................... H04W 4/021
                                                    455/456.3
2018/0121828 A1* 5/2018 Keysers ............... G06N 99/005

* cited by examiner

AUTOMATIC LOCATION-BASED NOTIFICATIONS FOR A GROUP OF USERS

FIELD

Embodiments herein relate generally to systems and methods for automatically generating a notification to a user of a communication device.

BACKGROUND

Currently, a communication device such as a mobile device and a smart mobile phone is typically equipped to detect the location of the device using a sensor such as a Global Positioning System (GPS) tracker. Some location-based mobile applications (mobile apps or apps) may generate notifications based on a detected location. Examples of such notifications include those related to: shopping, directions, or local weather. Some mobile applications allow a user to share a current location with other users, which may be useful to track family and friends. Some mobile applications may generate a notification when a user enters or leaves a predefined location, which may be useful for parents to see that their children arrived home safely from school, for example.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, numerous specific details are set forth. However, it is understood that embodiments may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

According to one aspect disclosed herein, a group includes three or more users, each user being a user of a communication device, and if a user meets with another member of the group at a location, the user's communication device automatically generates a notification and transmits the notification to one or more members of the group. In one embodiment, transmission of the notification may be first approved by the user prior to transmission. The notification may include information regarding at least one of: the context of the meeting, a status of the meeting, the identity of the users at the meeting, a time of the meeting, and a location of the meeting. In one embodiment, the communication device may automatically perform an action based on the notification.

By virtue of automatically generating such a notification, in a situation where a caregiver or parent picks up a child from a location (e.g., school, etc.), a notification may be automatically generated for other members of the family indicating that the child has been picked up or is with the caregiver. Automatic generation of such a notification based on a meeting of group members may also be useful to coordinate social events. For example, the other group members may join the group at the meeting location based on reception of the notification.

Figure 1A:
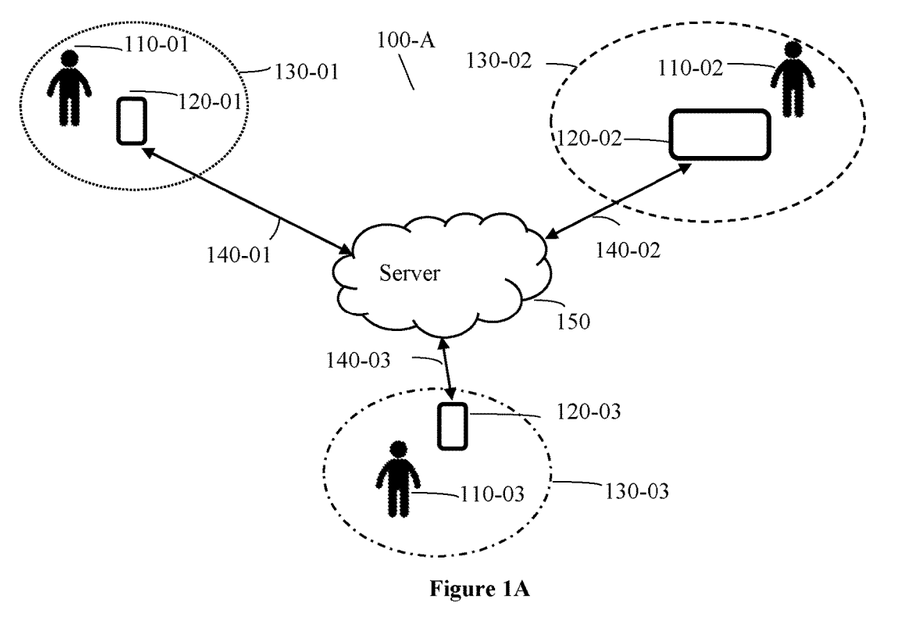
FIG. 1A illustrates a system for automatically generating a notification to a group of users based on location of members of the group according to one embodiment.
Figure 1B:
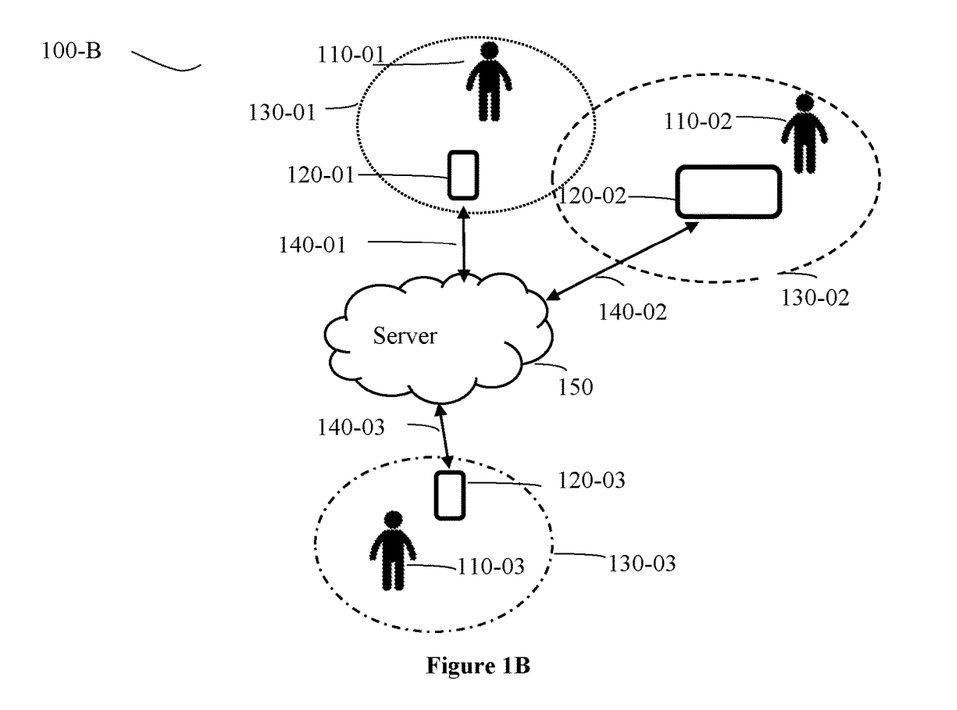
FIG. 1B illustrates a system for automatically generating a notification to a group of users based on location of members of the group according to one embodiment.

FIGS. 1A and 1B illustrate example systems 100-A and 100-B for automatically generating notifications to one or more members of a group of users based on a location of members of the group. Systems 100-A and 100-B may be implemented by hardware, software, etc. or any combination thereof. Such hardware may include FPGA, ASIC, and/or other custom hardware logic.

FIGS. 1A and 1B each show a group consisting of users 110 (individually, users 110-01, 110-02, and 110-03). Therefore, in the embodiments of FIGS. 1A and 1B, a group is defined as three users. In other embodiments, a group may include three or more users.

Figure 3:
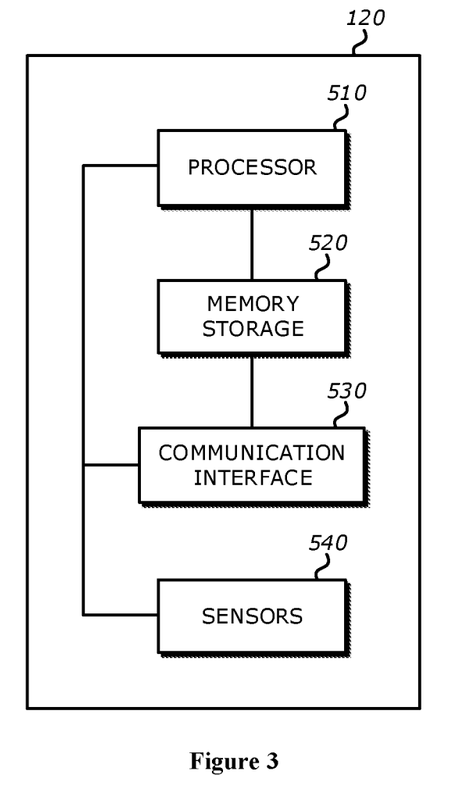
FIG. 3 illustrates a system for explaining example components of the communication devices illustrated in FIGS. 1A and 1B according to an embodiment.

Users 110 are equipped with communication devices 120 (individually, communication devices 120-01, 120-02, and 120-03). In some embodiments, communication devices 120 may be mobile devices (e.g., smartphones), personal computers, portable computers, handheld computers, tablet computers, laptops, notebooks, wearable devices (e.g., smartwatches), media players, personal data organizers, vehicles, or other similar devices. In some embodiments, a communication device may be any device capable of displaying a notification. A notification refers to a particular parcel of information to be displayed by a communication device to a user. Communication devices 120 may each have appropriate hardware such as one or more processors, one or more memories, one or more sensors (e.g., GPS, gyroscope, accelerometer, compass, barometer, etc.), and connectivity hardware (e.g., 3G/LTE Modem, Wi-Fi, Bluetooth, Near Field Connectivity (NFC), etc.). Example components of communication devices 120 are illustrated in FIG. 3. As shown in FIG. 3, each communication device may include a processor 510, memory storage 520, a communication interface 530 and sensors 540. Returning to FIGS. 1A and 1B, each of communication devices 120 communicates with server 150 via networks 140 (individually, 140-1, 140-02, 140-03). The networks 140 may be mobile networks (3G/LTE), Wi-Fi, Ethernet etc.

Communication between servers 150 and communication devices 120 may be generated due to transmission of notifications automatically generated by one or more of communication devices 120. The notifications may be delivered via networks 140 or any suitable mobile network, wireless network, wired network. The notifications may be received by a receiver included in a communication interface (e.g., communication interface 530 shown in FIG. 3).

Systems 100-A and 100-B detect a location of each of the users 120. The location of a user may be detected within an error bound, as shown by boundaries 130 (individually 130-01, 130-02, 130-03). As one example, the location of user 110-01 of communication device 120-01 may be detected by system 100-A or 100-B within error bound 130-01. The location may be detected using various mechanisms including GPS, mobile networks (3G/LTE), Wi-Fi, Ethernet, and/or other appropriate sensors individually or in combination as required to fix boundaries 130 of the locations accurately.

As shown in FIG. 1A, users 110-01, 110-02, and 110-03 are each located in a different geographic position (i.e., not co-located). In one embodiment, system 100-A detects location boundaries 130-01, 130-02, and 130-03 for each of users 110-01, 110-02, and 110-03, and compares the locations to determine whether any of users 110 are located in a same or similar position. In one embodiment, the comparison comprises determining whether the location boundaries overlap. If it is determined that none of the location boundaries are overlapping (as shown in FIG. 1A), the system determines that the users are each in a different geographical position (i.e., are not co-located). On the other hand, if one or more users moves locations such that a location boundary overlaps with another location boundary, the system determines that at least two of the location boundaries are overlapping and that the users having the overlapping location boundaries are co-located. For example, if user 110-01 moves locations such that location boundary 130-01 overlaps with location boundary 130-02 as shown in FIG. 1B, the system determines that location boundaries 130-01 and 130-02 as shown in FIG. 1B are overlapping and determines that the users 110-01 and 110-02 as shown in FIG. 1B are co-located.

In one embodiment, if the system detects that there has been a meeting of at least two users (i.e., two or more of the users are co-located), a notification is automatically sent to other users in the group (e.g., user 110-03). In other embodiments, the notification is transmitted after approval by the user of the communication device that generated the notification. In one embodiment, the notification indicates a meeting between two or more users in the group. The notification may include information regarding one or more of: the context of the meeting, a status of the meeting, the identity of the users at the meeting, and a location of the meeting. The system may take other appropriate actions based on the context of the meeting of user 110-01 and 110-02 at the location.

Figure 2:
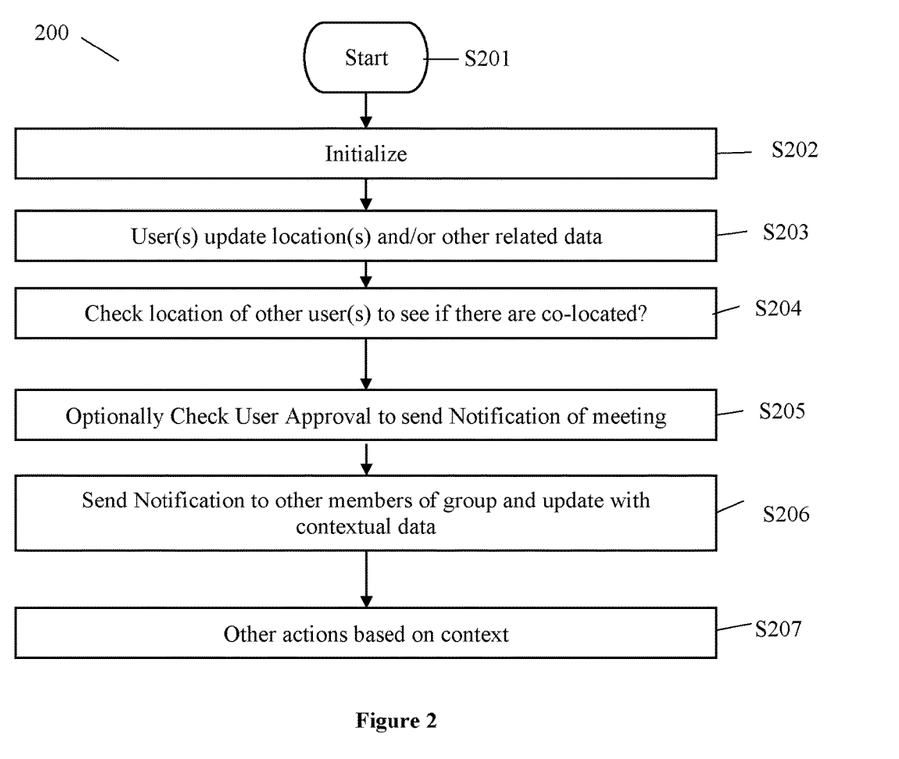
FIG. 2 illustrates a flow chart for explaining a process for automatically generating notification to a group of users based on location of members of the group according to one embodiment.

FIG. 2 illustrates a flow chart 200 for explaining a process for automatically generating a notification according to one example embodiment. In this regard, the following embodiment may be described as a process 200, which is may be depicted as a flowchart, a flow diagram, a structure diagram, or a block diagram. Although the flow chart may describe the operations as a sequential process, many of the operations can be performed in parallel or concurrently. In addition, the order of the operations may be re-arranged. A process is terminated when its operations are completed. A process may correspond to a method, a procedure, etc. Process 200 may be performed by processing logic that includes hardware (e.g. circuitry, dedicated logic, etc.), software (e.g., embodied on a non-transitory computer readable medium), or a combination thereof.

In one embodiment, the process 200 may be executed by one or more communication devices (e.g., communication devices 120). Referring to FIG. 2, the process 200 begins at block S201. At block S202, the communication device performs an initialization process. During the initialization process, a group structure, group policies, location detection algorithms, etc., are established. In addition, the locations of users in the group are collected, along with any other related data.

At block S203, the communication device updates one or more locations of the users in the group to obtain current locations. The location updates can be based on information provided by GPS, a mobile network (e.g., LTE), and the like. The communication device can also update other related data including Wi-Fi connectivity, Bluetooth connectivity, and other updates to sensor data. This information can be used to update user location.

At block S204, the communication device checks the current locations of other users in the group to determine whether any of the other users are currently located in a same or similar position (i.e., are co-located). In one embodiment, the current locations of other users are compared to the current position of the user as discussed above in connection with FIGS. 1A and 1B. If it is determined that none of the users are co-located (i.e., there has not been a meeting), process 200 returns to block S203 where one or more locations of the users in the group are updated (not explicitly shown in FIG. 2). If it is determined that at least two of the users are co-located (there has been a meeting), the process 200 then optionally continues to block S205, in which the system checks to see whether user approval is required before sending a notification to the other users in the group. If it is determined that user approval is required, approval is requested from the user (not explicitly shown). If approval is obtained, or in the case that approval is not required, process 200 continues to block S206.

At block S206, a notification is automatically generated by the communication device and is transmitted to other users in the group. In one embodiment, the notification is updated with contextual data obtained at block S203. In one embodiment, the notification includes details about the meeting or co-location of users detected at block S204, such as the identity of the users that are co-located. In one embodiment, the notification includes other contextual data such as the location of the meeting, the time of the meeting, or any other relevant details. In one embodiment, the notification is transmitted to all of the other users in the group. In one embodiment, the system sends the notification to only certain members of the group according to the nature of the meeting and the users.

At block S207, based on the meeting details (e.g., identity of the co-located users, location of the meeting, time of the meeting, etc.), other actions may automatically be taken by the communication device and/or the system. For instance, if the system detects that users in the meeting are moving at the same speed (indicating that they are traveling together), the system may continuously update other members of the group with periodic updates of the co-located users. This update may continue for a predetermined period of time, or until the users in the meeting are determined to have reached a predetermined location. Upon termination, the process 200 returns to block S203 (not explicitly shown in FIG. 2).

Turning again to FIG. 3, as mentioned above, example components of communication devices 120 include processor 510, memory storage 520, communication interface 530 and sensors 540. The communication interface 530 may be a network communication interface such as a wired network interface (e.g., an IEEE 802.3 Ethernet interface), as well as a wireless interface (e.g., an IEEE 802.11 WiFi interface). Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). In one embodiment, the communication interface 530 may receive location information and related data from each of a plurality of mobile devices. The location information from each of the mobile devices may identify a location of each of the mobile devices, respectively. Connection information may also be received from each of the communication devices to identify one of a plurality of connection sources as a preferred connection source used to identify the location of each of the mobile devices, respectively. For instance, the communication interface 530 may receive, from the communication device, location information including the location of the communication device and communication source information identifying cell towers.

The processor 510 that is coupled to the communication interface 530 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 510 may be used to control the operations of the communication interface 530. For example, the processor 510 may be coupled to the communication interface 530 and executes software to control the wireless network communications functionality of the communication device 120 (e.g. communicating with a network to transmit and receive data to other components of the system (e.g., servers) via the communication interface 530). In some cases, a particular function may be implemented as two or more pieces of software that are being executed by different hardware units of a processor.

In one embodiment, the processor 510 is also coupled to the memory storage 520 that may include one or more different types of storage such as hard disk drive storage, nonvolatile memory, and volatile memory such as dynamic random access memory. The memory storage 520 may store a plurality of location information and a history of connection information for each location information received from communication devices.

The memory device 520 may also store instructions (e.g. software; firmware), which may be executed by the processor 510. In one embodiment, when the instructions stored in memory device 520 are executed by the processor 510, the processor 510 performs methods for automatically generating a notification based on a meeting of users in a group. In some embodiments, the processor 510 may receive the location information from the sensors 540, and store, in the memory storage 520, the location information. The processor 510 may also control the functions of the communication interface 530 by signaling to the communication interface 530 to transmit notifications and other data the mobile devices.

The processor 510, memory storage 520, communication interface 530, and the sensors 540 communicate to input devices and output devices via one or more communication links such as a bus. The communication links may also be other wired or wireless communication links.

Embodiments herein may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method for notification for members of a group, each member of the group using a portable communication device, the method comprising:

obtaining a current location boundary of the portable communication device of each member;

determining whether there is a meeting of two or more of the members by determining whether a first location boundary of a first portable communication device of a first member overlaps a second location boundary of a second portable communication device of a second member;

when it is determined that the first location boundary of the first portable communication device overlaps the second location boundary of the second portable communication device, automatically generating a notification including a context of the meeting, transmitting the notification to remaining members of the group other than the first and second members, the remaining members being members of the group with portable communication devices having current location boundaries not in the first location boundary of the first portable communication device and the second location boundary of the second portable communication device, wherein the notification is displayed on communication devices associated with the remaining members of the group, respectively, based on the context of the meeting, performing an automatic response and detecting a first moving speed of the first member and a second moving speed of the second member to determine whether the first member and the second member are traveling together, and in response to determining that the first and second members are traveling together, continuously updating the remaining members with periodic updates of the first and second members until the first and second members are determined to have reached a predetermined location.

2. The method of claim 1, further comprising obtaining authorization before transmitting the notification to remaining members of the group.

3. The method of claim 1, wherein the notification includes information regarding a location of the overlap of the first and second location boundaries, identities of the users at the meeting, a time of the meeting, and a status of the meeting.

4. The method of claim 1, further comprising: in response to determining that the first location boundary overlaps the second location boundary, determining that the first member and the second member are co-located.

5. The method of claim 1, wherein the automatic response comprises periodically providing to the remaining members of the group an updated location.

6. The method of claim 1, further comprising an initialization process to determine a group structure, a group policy, and a location detection algorithm.

7. A portable communication device including a notification system for notifying members of a group, the portable communication device comprising:
a processor;
a communication interface to receive and transmit one or more notifications;
a memory storage storing instructions that, when executed by the processor, causes the processor to:
obtain a current location boundary of a portable communication device of each member;
determine whether there is a meeting of two or more of the members by determining whether a first location boundary of a first portable communication device of a first member overlaps a second location boundary of a second portable communication device of a second member;
when it is determined that the first location boundary of the first portable communication device overlaps the second location boundary of the second portable communication device,
automatically generate a notification including a context of the meeting,
transmit the notification to remaining members of the group other than the first and second members, the remaining members being members of the group with portable communication devices having current location boundaries not in the first location boundary of the first portable communication device and the second location boundary of the second portable communication device,
based on the context of the meeting, perform an automatic response and detect a first moving speed of the first member and a second moving speed of the second member to determine whether the first member and the second member are traveling together, and
in response to determining that the first and second members are traveling together, continuously update the remaining members with periodic updates of the first and second members until the first and second members are determined to have reached a predetermined location.

8. The portable communication device of claim 7, wherein the instructions further cause the processor to obtain authorization before transmitting the notification to remaining members of the group.

9. The portable communication device of claim 7, wherein the notification includes information regarding a location of the overlap of the first and second location boundaries, identities of the users at the meeting, a time of the meeting, and a status of the meeting.

10. The portable communication device of claim 7, wherein the processor is further to: in response to determining that the first location boundary overlaps the second location boundary, determine that the first member and the second member are co-located.

11. The portable communication device of claim 7, wherein the automatic response comprises periodically providing to the remaining members of the group an updated location.

12. The portable communication device of claim 7, wherein the instructions further cause the processor to perform an initialization process to determine a group structure, a group policy, and a location detection algorithm.

13. A non-transitory computer-readable medium having stored thereon instructions that, when executed by a processor, causes the processor to perform a method for notification for members of a group, each member of the group using a portable communication device, the method comprising:
obtaining a current location boundary of the portable communication device of each member;
determining whether there is a meeting of two or more of the members by determining whether a first location boundary of a first portable communication device of a first member overlaps a second location boundary of a second portable communication device of a second member;
when it is determined that the first location boundary of the first portable communication device overlaps the second location boundary of the second portable communication device,
automatically generating a notification including a context of the meeting,
transmitting the notification to remaining members of the group other than the first and second members, the remaining members being members of the group with portable communication devices having current location boundaries not in the first location boundary of the first portable communication device and the second location boundary of the second portable communication device,
based on the context of the meeting, performing an automatic response and detecting a first moving speed of the first member and a second moving speed of the second member to determine whether the first member and the second member are traveling together, and
in response to determining that the first and second members are traveling together, continuously updating the remaining members with periodic updates of the first and second members until the first and second members are determined to have reached a predetermined location.

14. The non-transitory computer-readable medium of claim 13, further comprising obtaining authorization before transmitting the notification to remaining members of the group.

15. The non-transitory computer-readable medium of claim 13, wherein the notification includes information regarding a location of the overlap of the first and second location boundaries, identities of the users at the meeting, a time of the meeting, and a status of the meeting.

16. The non-transitory computer-readable medium of claim 13, wherein the method further comprises: in response to determining that the first location boundary overlaps the second location boundary, determining that the first member and the second member are co-located.

17. The non-transitory computer-readable medium of claim 13, wherein the automatic response comprises periodically providing to the remaining members of the group an updated location.

18. The non-transitory computer-readable medium of claim 13, further comprising an initialization process to determine a group structure, a group policy, and a location detection algorithm.

\* \* \* \* \*